United States Patent [19]

Ukai et al.

[11] Patent Number: 4,787,712

[45] Date of Patent: Nov. 29, 1988

[54] ACTIVE MATRIX LIQUID CRYSTAL DISPLAY DEVICE HAVING CAPACITIVE ELECTRODES OPPOSITE THE SOURCE BUSES

[75] Inventors: Yasuhiro Ukai; Teizo Yukawa; Tomihisa Sunata, all of Kobe, Japan

[73] Assignee: Hosiden Electronics Co., Ltd, Osaka, Japan

[21] Appl. No.: 140,681

[22] Filed: Jan. 4, 1988

[30] Foreign Application Priority Data

Jan. 16, 1987 [JP] Japan .................................... 62-7656

[51] Int. Cl.$^{4}$ ................................................ G02F 1/13

[52] U.S. Cl. .................................... 350/333; 350/336; 350/339 R; 340/765; 340/784

[58] Field of Search .................... 350/333, 336, 339 R

[56] References Cited

U.S. PATENT DOCUMENTS

| | | | |
|---|---|---|---|
| 4,112,333 | 9/1978 | Asars et al. | 350/333 X |
| 4,359,729 | 11/1982 | Nonomura et al. | 350/333 X |
| 4,431,271 | 2/1984 | Okubo | 350/333 X |
| 4,548,474 | 10/1985 | Nagae et al. | 350/333 |
| 4,679,909 | 7/1987 | Hamada et al. | 350/333 |
| 4,728,172 | 3/1988 | Cannella | 350/333 X |

*Primary Examiner*—Stanley D. Miller

*Assistant Examiner*—Richard Gallivan

*Attorney, Agent, or Firm*—Pollock, VandeSande and Priddy

[57] ABSTRACT

Liquid crystal is sealed in between a pair of opposed first and second transparent substrates, picture element electrodes, gate buses, and source buses are formed on the first transparent substrate, and thin film transistors are each disposed at one of the intersections of the source and gate buses, thereby constituting an active matrix liquid crystal display element. On the first transparent substrate there are provided capacitive electrodes respectively opposite the source buses, with an insulating layer interposed therebetween, and the capacitive electrodes are connected to a common potential point.

6 Claims, 3 Drawing Sheets

19

35

32

31

ACTIVE MATRIX LIQUID CRYSTAL DISPLAY DEVICE HAVING CAPACITIVE ELECTRODES OPPOSITE THE SOURCE BUSES

BACKGROUND OF THE INVENTION

The present invention relates to an active matrix liquid crystal display device which is composed of an active matrix liquid crystal display element in which picture element electrodes are arranged in a matrix form in a liquid crystal cell and electric charges are charged into and discharged from the picture element electrodes by thin film transistors to provide a display, and a driver for driving the liquid crystal display element.

A conventional liquid crystal display element of this kind has such a structure as shown in FIG. 1, in which a pair of transparent substrates 11 and 12 as of glass are disposed opposite but adjacent each other, with a spacer 13 interposed between their marginal edges, and liquid crystal 14 is sealed in between the transparent substrates 11 and 12, constituting a liquid crystal cell 10. On the inside surface of the transparent substrate 11 a plurality of picture element electrodes 15 are provided and a thin film transistor 16 is disposed, as a switching element, adjacent each picture element electrode 15, the thin film transistor 16 having its drain connected to the picture element electrode 15. On the inner surface of the other transparent substrate 12 a transparent common electrode 17 is disposed in opposing relation to the plurality of picture element electrodes 15.

As shown in FIG. 2, the picture element electrodes 15 square in shape are arranged in a matrix form on the transparent substrate 11, a gate bus 18 is disposed adjacent and along each row arrangement of the picture element electrodes 15, and a source bus 19 is similarly disposed adjacent and along each column arrangement of the picture element electrodes 15. At each intersection of these gate and source buses 18 and 19 the thin film transistor 16 is provided, which has its gate connected to the gate bus 18, its source connected to the source bus 19 and its drain connected to the corresponding picture element electrode 15.

By applying voltage across selected ones of the gate and source buses 18 and 19, only that one of the thin film transistors 16 to which the voltage is applied is conducted, charging the picture element electrode 15 connected to the drain of the conducted thin film transistor 16. As a result, a voltage is applied across the liquid crystal 14 only between the charged picture element electrode 15 and the common electrode 17, by which only that portion of the liquid crystal 14 is made transparent or opaque, thus providing a selective display. The display can be erased simply by discharging the stored charges from the conducted picture element electrode 15.

For such selective control of the thin film transistors 16, a plurality of outputs of a gate driver 21 which is able to drive the gate buses 18 individually are connected thereto and outputs of a source driver 22 are connected to the source buses 19, respectively.

A one-latch-type source driver typically used as the source driver 22 is simple-structured, but when the product of the source input capacitance value and the resistance value between adjacent source buses is small, crosstalk will be produced between the source buses 19, leading to the deterioration of the display characteristic such as lowering of the contrast of a display.

SUMMARY OF THE INVENTION

It is therefore an object of the present invention to provide an active matrix liquid crystal display device which is free from the above-said defect of the prior art.

In the active matrix liquid crystal display device of the present invention, capacitive electrodes each of which is disposed opposite one of the source buses with an insulating layer interposed therebetween are formed on the transparent substrate of the liquid crystal cell on which are provided the picture element electrodes, the thin film transistors, the source buses, and so forth. The capacitive electrodes are connected to a common potential point, providing a desired electrostatic capacitance between each of them and the source bus corresponding thereto.

As mentioned above, according to the present invention, the desired electrostatic capacitance is formed by providing the capacitive electrodes in opposing relation to the source buses in the liquid crystal cell, and the source input capacitance becomes large accordingly. In consequence the product of the source input capacitance value and the resistance value between adjacent source buses also becomes large, making it difficult for crosstalk to be generated between the source buses. In addition, since the capacitive electrodes for increasing the source input capacitance are disposed opposite the source buses, even relatively large capacitance values can easily be obtained with no particular necessity of increasing the area of the liquid crystal cell.

BRIEF DESCRIPTION OF THE DRAWINGS

FIG. 7A being its plan view, FIG. 7B its right side view and FIG. 7C its sectional view.

DESCRIPTION OF THE PREFERRED EMBODIMENTS

Figure 1:
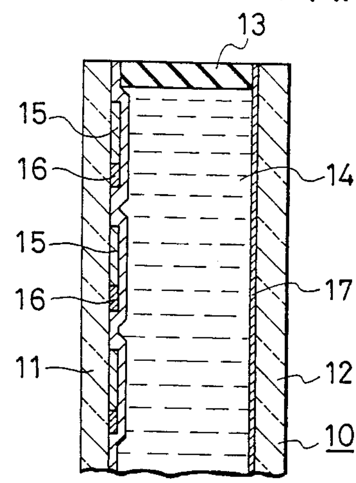
FIG. 1 is a sectional view showing a portion of a prior art liquid crystal cell.
Figure 2:
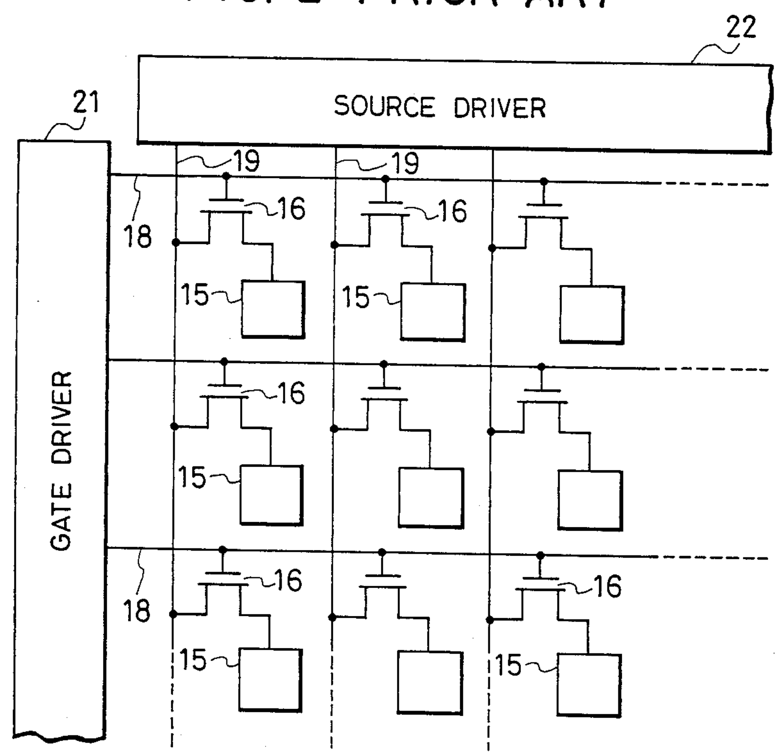
FIG. 2 is an equivalent circuit diagram of the prior art liquid crystal display device.
Figure 3A:
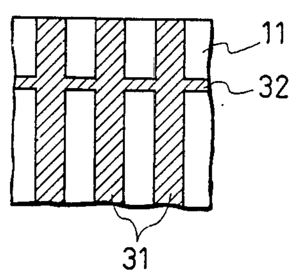
FIG. 3A is a plan view showing capacitive electrodes 31 employed in the device according to the present invention.
Figure 3B:
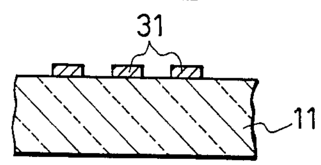
FIG. 3B is a sectional view of FIG. 3A.

FIGS. 3A, 3B to 5A, 5B show a sequence of steps involved in the fabrication of the principal part of an example of the liquid crystal display device according to the present invention. In FIGS. 3A and 3B the transparent substrate 11 is the one of the substrates of the liquid crystal cell 10 depicted in FIG. 1. The transparent substrate 11 carries the picture element electrodes 15, the thin film transistors 16, the gate buses 18 and the source buses 19, though not shown.

In this embodiment such capacitive electrodes 31 as depicted in FIGS. 3A and 3B are each formed on the substrate 11 in opposing relation to one end portion of each source bus 19 (on the side of a connection terminal, for example) to be formed. The capacitive electrodes 31 are connected to a common potential point via a common potential point connection line 32 which extends in the direction of arrangement of the capacitive electrodes 31 for connecting them together. The common potential point connection line 32 is formed simultaneously with the formation of the capacitive electrodes 31.

Figure 4:
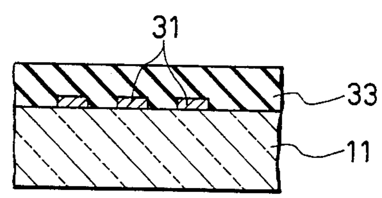
FIG. 4 is a sectional view showing an insulating layer 33 formed over the capacitive electrodes 31.
Figure 5A:
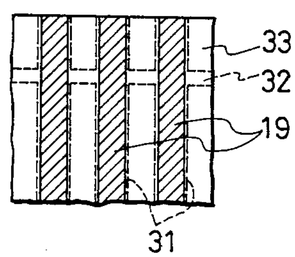
FIG. 5A is a plan view showing source buses 19 formed on the insulating layer 33.
Figure 5B:
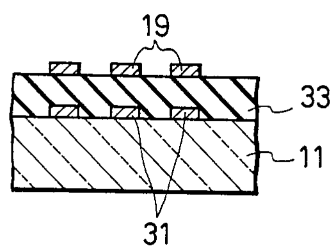
FIG. 5B is a sectional view of FIG. 5A.

As shown in FIG. 4, a $SiO_2$, $SiN_x$ or similar insulating layer 33 is deposited all over the surface of the substrate 11, covering the capacitive electrodes 31 and the common potential point connection line 32. Next, the source buses 19 are formed on the insulating layer 33 in opposing relation to the capacitive electrodes 31, respectively, as depicted in FIGS. 5A, 5B. Usually the picture element electrodes 15, the thin film transistors 16 and the gate buses 18 are formed on the insulating layer 33 in that order, though not shown.

Figure 6:
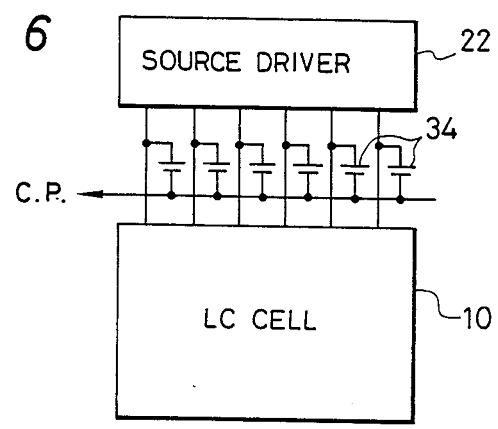
FIG. 6 is an equivalent circuit diagram of the principal part of the device of the present invention.

Thus, an electrostatic capacitance is provided between each capacitive electrode 31 and the corresponding source bus 18, and the electrostatic capacitance is connected to the common potential point via the common potential point connection line 32; and so that the input electrostatic capacitance of each source bus increases accordingly. In other words, as shown in FIG. 6, an electrostatic capacitance element 34 is connected between the common potential point and each connection line which interconnects the liquid crystal cell 10 and the source driver 22, and the electrostatic capacitance element 34 is formed by the source bus 19 and the capacitive electrode 31 in the liquid crystal cell 10.

In the case where the thin film transistor 15 includes a semiconductor layer formed of a material which has a photoconductive characteristic, such as amorphous silicon, the semiconductor layer is shielded from external light, by depositing a light shielding layer as of chromium or like metal on the substrate 11 and then forming an insulating layer, the picture element electrodes, the thin film transistors, etc. in a sequential order. The light shielding layer and the capacitive electrodes 31 can be formed at the same time. By forming the insulating layer 33 simultaneously with the formation of the insulating layer for the light shielding layer, the fabrication of the structure for increasing the source bus input capacitance does not call for any additional manufacturing steps therefor.

Figure 7A:
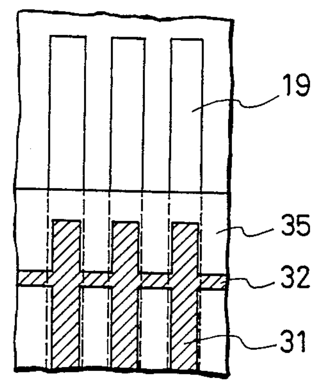
FIGS. 7A to 7C are schematic diagrams illustrating another example of the principal part of the device of the present invention.
Figure 7B:
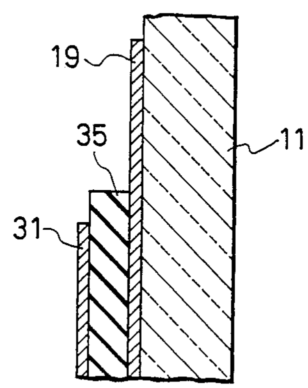
Figure 7C:
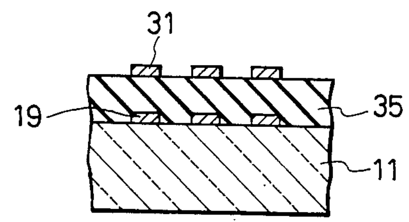

FIGS. 7A to 7C illustrate the principal part of another embodiment of the present invention. The illustrated structure is produced by the steps of forming the source buses 19 on the substrate 11, forming an insulating layer 35 all over the surface of the substrate 11 and the source buses 19, and forming the capacitive electrodes 31 on the insulating layer 35 in partly opposing relation to the source buses 19, along with the common potential point connection line 32 for connecting the capacitive electrodes 31 to the common potential point.

In general, the picture element electrodes 15 and the source buses 19 are concurrently formed, which is followed by the formation of the thin film transistors 19 for interconnecting them. The thin film transistors 16 are each produced by forming a semiconducor layer, a gate insulating film and a gate electrode in that order. Accordingly, simultaneous formation of the gate insulating film and the insulating layer 35 and simultaneous formation of the gate electrode and the capacitive electrodes 31 will save the necessity of involving any particular manufacturing steps for providing the electrostatic capacitance which increases the source bus input capacitance.

In the case where a time constant for sufficiently reducing crosstalk between adjacent source buses (the product of the source input capacitance value and the resistance value between adjacent source buses) is, for instance, 600 μs or more, and the insulating resistance between source buses of the assembled display devices are as small as 20 MΩ by some cause, it is necessary that the source input capacitance be designed to be 30 pF or more. Since the source input capacitance is usually on the order of 10 pF, however, an electrostatic capcitance of 20 pF needs only to be provided as the electrostatic capacitance between the source bus 19 and the capacitive electrode 31. In concrete terms, for example, where a narrower one of the pair of opposing source bus 19 and capacitive electrode 31 is 0.11 mm wide, the capacitive electrode 31 is 2.2 mm long and the insulating layer (an $SiO_2$ layer, in this example) 33 is 0.4 μm thick, a capacitance of about 20 pF is obtained. The capacitive electrode 31, 1.1 mm long, may also be provided at either end of each source bus 19 in opposing relation thereto.

As described above, according to the present invention, a capacitive electrode is disposed opposite each source bus to form an electrostatic capacitance therebetween, by which the source input capacitance can be made large. This reduces crosstalk between adjacent source buses, offering an active matrix liquid crystal display device of an excellent display characteristic. In addition, the electrostatic capacitance for increasing the source input capacitance is included in the liquid crystal cell, and the area of the liquid crystal cell need not be increased therefor. Incidentally, the inclusion of this electrostatic capacitance as an IC in the source driver 22 is attended with the defect of a marked increase in the area of the source driver 22. Furthermore, no particular manufacturing steps are needed for obtaining the electrostatic capacitance intended to increase the source input capacitance, as described previously.

It will be apparent that many modifications and variations may be effected without departing from the scope of the novel concepts of the present invention.

What is claimed is:

1. An active matrix liquid crystal display device in which liquid crystal is sealed in between a pair of opposed first and second transparent substrates, picture element electrodes are arranged in a matrix form on the inner surface of the first transparent substrate, gate buses are each disposed along one of the row arrangements of the picture element electrodes, source buses are each disposed along one of the column arrangements of the picture element electrodes, a thin film transistor is provided at each intersection of the gate and source buses, and the gate, source and drain of the thin film transistor are connected to the gate bus, the source bus and the picture element electrode corresponding to the thin film transistor, whereby a liquid crystal display element is constituted;

wherein a plurality of outputs of a source driver are connected to the source buses, respectively;

capacitive electrodes are provided on the first transparent substrate in opposing relation to the source buses, respectively, with an insulating layer sandwiched therebetween; and the capacitive electrodes are connected to a common potential point to form a desired electrostatic capacitance between each of the capacitive electrode and the corresponding source bus.

2. The device of claim 1, wherein a common potential point connection line is provided along the direction of arrangement of the capacitive electrodes, for connecting them to the common potential point.

3. The device of claim 1, wherein the capacitive electrodes are disposed closer to the first transparent substrate than the source buses.

4. The device of claim 3, wherein a light shielding layer of metal is disposed opposite the thin film transistors, the light shielding layer and the capacitive electrodes are formed simultaneously, and an insulating layer between the light shielding layer and the thin film transistors and the insulating layer are formed simultaneously.

5. The device of claim 1, wherein the capacitive electrodes are disposed on the side opposite from the first transparent substrate relative to the source buses.

6. The device of claim 5, wherein the insulating layer is formed simultaneously with gate insulating films of the thin film transistors and the capacitive electrodes are formed simultaneously with gate electrodes of the thin film transistors.

* * * * *